//i2.com/patents/page#5001356

United States Patent [19]

Ichikawa

[11] Patent Number: 5,001,356

[45] Date of Patent: Mar. 19, 1991

[54] SHEET THICKNESS MEASURING APPARATUS

[75] Inventor: Shigeru Ichikawa, Fujimiya, Japan

[73] Assignee: Meisan Co., Ltd., Fuji, Japan

[21] Appl. No.: 405,281

[22] Filed: Sep. 11, 1989

[30] Foreign Application Priority Data

Oct. 12, 1988 [JP] Japan ................ 63-256459

[51] Int. Cl.$^5$ ............................................. G01V 9/04
[52] U.S. Cl. .................................. 250/560; 356/381; 324/230
[58] Field of Search ............... 250/560; 356/381, 384; 324/230, 207.26

[56] References Cited

U.S. PATENT DOCUMENTS 4,849,694 7/1989 Coates ................... 324/230

Primary Examiner—David C. Nelms
Assistant Examiner—Sherrie Hsia
Attorney, Agent, or Firm—Fleit, Jacobson, Cohn, Price, Holman & Stern

[57] ABSTRACT

A sheet thickness measuring apparatus for measuring the thickness of a sheet comprises a metallic backup surface for supporting the sheet, a magnetic field utilization sensor arranged above the said metallic backup surface for measuring a distance up to the metallic backup surface in a non-contact form, an optical sensor arranged above the metallic backup surface for measuring a distance up to the metallic backup surface or a top surface of the sheet supported on the metallic backup surface in a non-contact form, and means for computing the thickness of the sheet on the basis of the distance measured by the magnetic field utilization sensor and the distance measured by the optical sensor. The sheet thickness measuring apparatus may further comprise storage means for storing correcting measured value based on distance measured value measured along the metallic backup surface by at least the magnetic field utilization sensor of the magnetic field utilization sensor and the optical sensor in the state that the sheet is not placed, and correcting means for correcting at least the distance measured value measured by the magnetic field utilization sensor of distance measured values measured by the magnetic field utilization sensor and the optical sensor in the state that the sheet is placed on the metallic backup surface with the correcting measured value stored in the storage means.

5 Claims, 4 Drawing Sheets

SHEET THICKNESS MEASURING APPARATUS

BACKGROUND OF THE INVENTION

1. Field of the Invention

This invention relates to a sheet thickness measuring apparatus for measuring the thickness of a sheet, such as a paper sheet, an opaque plastic film, a metal foil, or the like with a magnetic field utilization sensor and an optical sensor.

2. Description of the Prior Art

A conventional sheet thickness measuring apparatus of this type measures, as schematically shown in FIG. 5 of the accompanying drawings, the thickness of a sheet 2 by scanning a sensor assembly 5 including a magnetic field utilization sensor 3, such as a magnetic sensor or an eddy current sensor or the like and an optical sensor 4 along the sheet 2 placed on a metallic backup plate 1. In principle, the distance $l_1$ to the surface of the metallic backup plate 1 is measured by the magnetic field utilization sensor 3, the distance $l_2$ to the upper surface of the sheet 2 is measured by the optical sensor 4, and the thickness t of the sheet 2 is obtained at the point by the following equation.

$$t = l_1 - l_2$$

However, when the thickness of the sheet is actually measured by such a conventional sheet measuring apparatus, it can be measured in accuracy up to approx. 1/100 mm without problem, but there arises a trouble when it is measured in accuracy up to approx. 1/1000 mm. This trouble remarkably occurs particularly when it is measured while moving the sensor with respect to the metallic backup plate.

For example, when the sensor assembly 5 is scanned on the surface of the metallic backup plate 1 on which the sheet 2 is not placed and the output characteristics of the magnetic sensor 3 and the optical sensor 4 at that time are recorded, the relationships between the magnetic output, the optical output and the scanning positions become as shown in FIG. 6. FIG. 6(A) shows an example of the output characteristic of the magnetic sensor 3, and FIG. 6(B) shows an example of the output characteristic of the optical sensor 4. Since the magnetic sensor 3 and the optical sensor 4 measure the same surface, the output characteristics of the magnetic sensor 3 and the optical sensor 4 must become the same configuration in this case, but, as apparent when FIG. 6(A) is compared with FIG. 6(B), the output characteristic of the magnetic sensor 3 is varied largely and complicately as compared with that of the optical sensor 4. The causes can be presumed from various experiments, references and studies, and it is considered that the local magnetization and irregular quality of the materials of the metallic backup plate seem to be causes of an error of the magnetic sensor. If a magnetic material is employed as the metallic backup plate, when a magnet is attached partly and locally magnetized (several gausses) and scanned, the output of the magnetism utilization sensor exhibits a variation of several tens microns. When the surface of the backup plate is examined by a gaussmeter, there is a position exhibiting a large variation even if it exhibits no variation in the output of the sensor (where the resolution of the gaussmeter is 0.1 gauss). Similar problem occurs even if a non-magnetic material is employed as the metallic backup plate and an eddy current type magnetic sensor is used. This is because the error of the magnetic field utilization sensor is considered to disturb to raise the measuring accuracy of the sheet thickness measuring apparatus of this type.

An object of this invention is to provide a sheet thickness measuring apparatus which can eliminate the above described conventional problems.

SUMMARY OF THE INVENTION

According to an aspect of this invention, there is provided a sheet thickness measuring apparatus for measuring the thickness of a sheet, said apparatus comprising a metallic backup surface for supporting said sheet, a metal sensitive sensor arranged above said metallic backup surface for measuring a distance up to said metallic backup surface in a non-contact form, an optical sensor arranged above said metallic backup surface for measuring a distance up to said metallic backup surface or a top surface of said sheet supported on said metallic backup surface in a non-contact form, and means for computing the thickness of said sheet on the basis of the distance measured by said metal sensitive sensor and the distance measured by said optical sensor.

According to another aspect of this invention, there is provided a sheet thickness measuring apparatus for measuring the thickness of a sheet on the basis of the distance measured values of a magnetic field utilization sensor and an optical sensor by scanning said magnetic field utilization sensor and said optical sensor along the sheet on a metallic backup surface comprising storage means for storing correcting measured value based on distance measured value measured along said metallic backup surface by at least said magnetic field utilization sensor of said magnetic field utilization sensor and said optical sensor in the state that said sheet is not placed, and correcting means for correcting at least the distance measured value measured by said magnetic field utilization sensor of distance measured values measured by said magnetic field utilization sensor and said optical sensor in the state that said sheet is placed on said metallic backup surface with said correcting measured value stored in said storage means.

This invention will now be described in further detail with regard to preferred embodiments as illustrated in the accompanying drawings.

DESCRIPTION OF THE PREFERRED EMBODIMENTS

Figure 1:
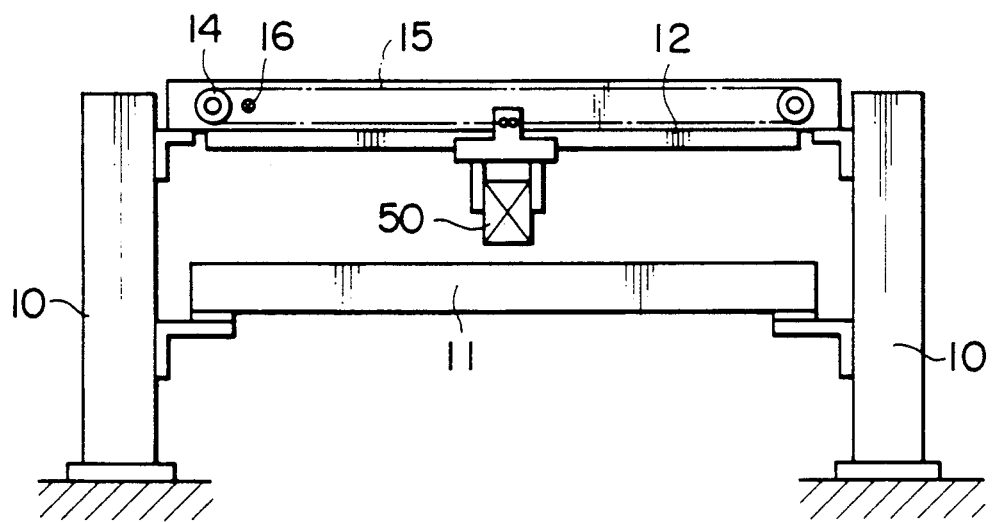
FIG. 1 is a front view schematically showing the structure of a sheet thickness measuring apparatus according to an embodiment of this invention.

As shown in FIG. 1, a metallic backup plate 11 is horizontally supported between supporting frames 10 of both sides. This metallic backup plate 11 may be made of a magnetic and metallic material, or may be made of a non-magnetic and metallic material such as aluminum, copper, stainless steel, etc., dependently on the types of magnetic sensors as being used (static magnetic field type sensor, eddy current type sensor, etc.). Further, a linear bearing 12 is supported at an interval in parallel above the metallic backup plate 11 between the supporting frames 10. A thickness sensor 50 having in combination a magnetic field utilization sensor and an optical sensor is slidably supported to the linear bearing 12. The thickness sensor 50 is connected to a chain 15 engaged between sprockets 14 driven by a scanning stepping motor 13 to move along the linear bearing 12 by the operation of the scanning stepping motor 13. An origin detecting proximity switch 16 is disposed near the left side sprocket 14 in FIG. 1.

In the sheet thickness measuring apparatus of this invention as described above, before the thickness of the sheet on the metallic backup plate 11 is measured, the magnetic characteristics pattern of the metallic backup plate 11 which is the cause of an error of the magnetic utilization sensor is read as below in the state that there is no sheet on the metallic backup plate 11.

Figure 2:
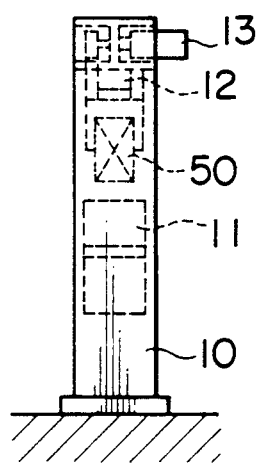
FIG. 2 is a side view schematically showing the structure of the sheet thickness measuring apparatus of FIG. 1.
Figure 3:
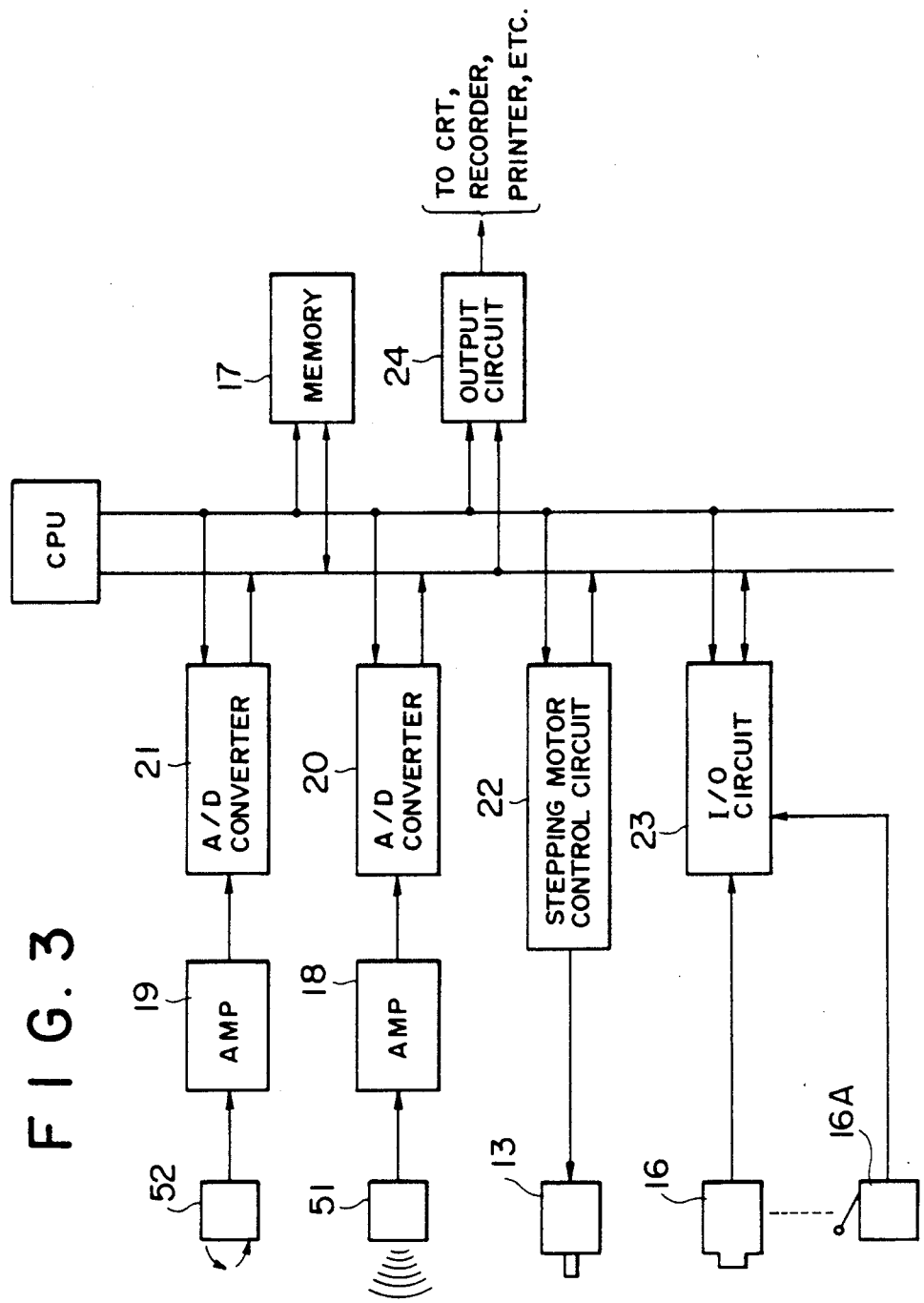
FIG. 3 is a block diagram schematically showing the configuration of the controller of the sheet thickness measuring apparatus of FIGS. 1 and 2.

As shown in FIG. 3, the controller has a central processing unit CPU composed mainly of a microcomputer, a memory 17 for storing various measured data, an amplifier 18 for amplifying a distance measurement signal of the magnetic field utilization sensor 51 of the thickness sensor 50, an amplifier 19 for amplifying a distance measurement signal of the optical sensor 52 of the thickness sensor 50, A/C converters 20 and 21 for converting the distance measurement signals of analog values amplified by the amplifiers 18 and 19 into digital data, a stepping motor control circuit 22 for controlling the operation of a scanning stepping motor 13, an input-/output circuit 23 for the origin detecting proximity switch 16 and other control limit switch 16A (not shown in FIGS. 1 and 2), and an output circuit 24 for outputting a measured result to a CRT, a recorder or a printer, etc.

Figure 4:
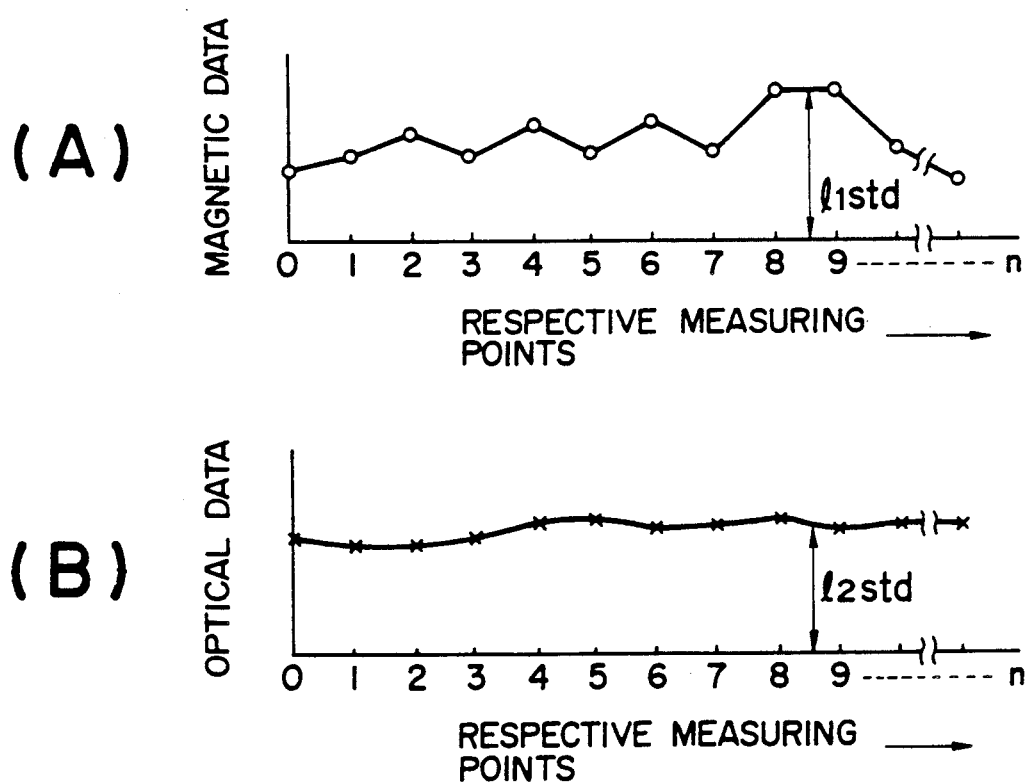
FIG. 4 is a view for explaining the data collecting state of sensors in storage scanning of reference value by the controller of FIG. 3.
Figure 5:
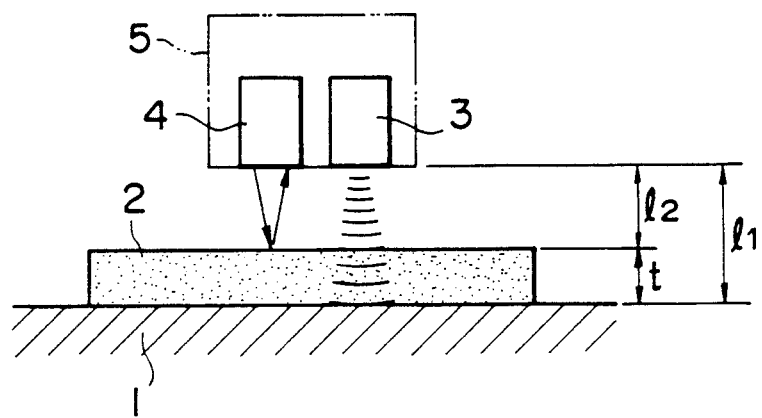
FIG. 5 is a schematic view for explaining the principle of the conventional sheet thickness measuring apparatus.
Figure 6A:
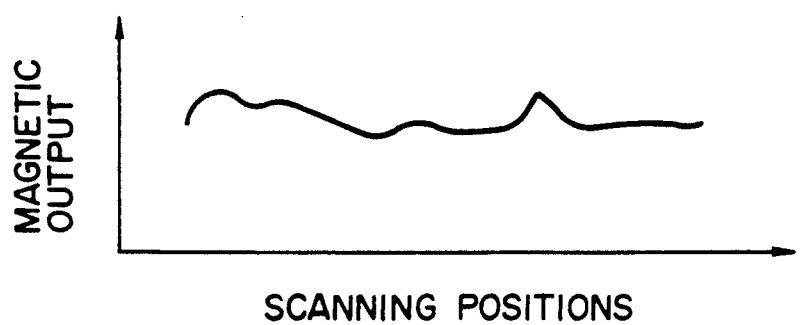
FIG. 6 is a view for exemplifying a variation in the distance measured values of magnetic field utilization sensor and optical sensor of the sheet thickness measuring apparatus of FIG. 5.
Figure 6B:
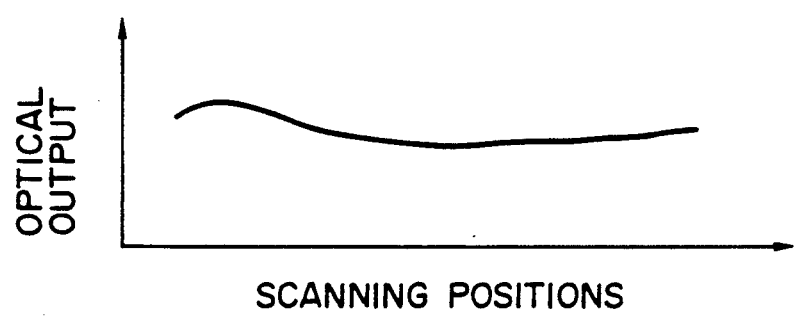

First, the central processing unit CPU feeds a command to the scanning stepping motor 13 so that the thickness sensor 50 is disposed at the origin position. In other words, the scanning stepping motor 13 is operated to the position where the origin detecting proximity switch 16 is operated by the thickness sensor 50 to move the thickness sensor 50. Then, it is scanned by the thickness sensor 50 from the origin position. This scanning is called "a storage scanning" for reading a reference value. Whenever the thickness sensor 50 is fed at a predetermined distance by the scanning stepping motor 13, the distance measurement signal of the magnetic field utilization sensor 51 is stored through the amplifier 18 and the A/D converter 20 in the memory 17 as the digital data, and the distance measurement signal of the optical sensor 52 is stored through the amplifier 19 and the A/D converter 21 in the memory 17 as the digital data. More specifically, the measured data at the respective points are stored through the central processing unit CPU in the memory 17 by images as shown in FIGS. 4(A) and 4(B) while scanning the thickness sensor 50 on the metallic backup plate 11 on which no sheet is placed. FIG. 4(A) shows a variation in the measured data at the respective measuring points of the magnetic field utilization sensor 51, and FIG. 4(B) shows a variation in the measured data at the respective measuring points of the optical sensor 51. The distance measured values (the distance from the upper surface of the metallic backup plate 11 to the magnetic field utilization sensor 51) of the magnetic field utilization sensor 51 at the respective measuring points are $l_{1std}$, and the distance measured values (the distance to the upper surface Of the metallic backup plate 11) of the optical sensor 52 are $l_{2std}$.

The scanning from the next time (called "measuring scanning") is conducted in the state that the sheet to be measured on the metallic backup plate 11 is placed. The thickness sensor 50 is again moved from the origin, and whenever the thickness sensor 50 arrives at the respective measuring points, the central processing unit CPU calculates subtraction variations $\Delta l_1$ and $\Delta l_2$ between the input reference values $l_{1std}$ and $l_{2std}$ at the previous storage scanning according to the following equations, where the distance measured value (the distance to the upper surface of the metallic backup plate 11) of the magnetic field utilization sensor 51 is $l_{1MES}$ and the distance measured value (the distance to the upper surface of the sheet) of the optical sensor 51 is $l_{2MES}$.

$$l_1 = l_{1std} - l_{1MES} \tag{2}$$

$$l_2 = l_{2std} = l_{2MES} \tag{3}$$

From the results, the thickness t of the sheet is obtained according to the following equation:

$$t = \Delta l_2 - \Delta l_1 \tag{4}$$

Thus, the adverse influence of the metallic backup plate 11 to the magnetic field utilization sensor 51 can be eliminated.

Even if the $l_{2std}$ value of the optical sensor 52 is not stored at the respective times in the reference storage scanning, it can be calculated theoretically. In this case, it is necessary to maintain the distance between the thickness sensor 50 and the metallic backup plate 11 the same at any scanning position. In the embodiment described above, the $l_{1std}$ and $l_{2std}$ are respectively stored in the memory 17. However, the thickness t of the sheet can be obtained by the following equation:

$$t_{std} = l_{1std} - l_{2std} \tag{5}$$

from the data $l_{1MES}$ and $l_{2MES}$ at the time of measuring scanning by calculating $t_{std}$ according to the following equation and storing the $t_{std}$.

$$t = l_{1MES} - l_{2MES} - t_{std} \tag{6}$$

This method can reduce the capacity of the memory 17 by half or less.

Further, in the embodiment described above, the storage scanning of the reference value has been described only in unidirectional scanning. However, in order to improve the accuracy, the storage scanning of the reference value may be conducted by reciprocating the thickness sensor. Further, in the above embodiment, the stepping motor is employed as the scanning power of the thickness sensor 50 and the driving and the position controlling are conducted in the open loop system.

However, it can be conducted in a feedback system with a servo motor and a rotary encoder.

In the embodiment described above, the metallic backup plate is employed as the measured reference surface. However, some material to be measured dislikes the contact with the plate. In this case, it is necessary to roll the reference surface to be measured. When the reference surface to be measured is rolled, the variation in the relative position between the thickness sensor and the rolling surface is applied not only to the scanning direction but to the rotating direction component of the roll. Accordingly, it must spirally store and measure to scan the same position of the surface of the roll. To this end, it is necessary to additionally mount a sensor (rotary encoder) for measuring the rotating amount of the roll and a sensor for measuring the origin signal of the rotating direction. When the moving speed and the movement starting point of the thickness sensor are suitably controlled in synchronization with the rotating amount of the roll according to the rotating amount signal and the origin signal, it can always scan the same surface of the roll.

Moreover, the magnetic field utilization sensor in the above described embodiment may be a static magnetic field type sensor, an eddy current type sensor, etc. and in place of them a high frequency oscillation type sensor may be used.

According to this invention, the error of the distance measurement of the magnetic field utilization sensor can be corrected in the sheet thickness measuring apparatus for measuring the thickness of the sheet on the basis of the distance measured values of the magnetic field utilization sensor and the optical sensor by scanning the magnetic field utilization sensor and the optical sensor along the sheet on the metallic backup plate. Therefore, the measuring accuracy of the sheet thickness can be improved.

What is claimed is:

1. A sheet thickness measuring apparatus for measuring the thickness of a sheet, said apparatus comprising a metallic backup surface for supporting said sheet, a metal sensitive sensor arranged above said metallic backup surface for measuring a distance up to said metallic backup surface in a non-contact form, an optical sensor arranged above said metallic backup surface for measuring a distance up to said metallic backup surface or a top surface of said sheet supported on said metallic backup surface in a non-contact form, and means for computing the thickness of said sheet on the basis of the distance measured by said metal sensitive sensor and the distance measured by said optical sensor.

2. A sheet thickness measuring apparatus for measuring the thickness of a sheet on the basis of the distance measured values of a magnetic field utilization sensor and an optical sensor by scanning said magnetic field utilization sensor and said optical sensor along the sheet on a metallic backup surface comprising storage means for storing correcting measured value based on distance measured value measured along said metallic backup surface by at least said magnetic field utilization sensor of said magnetic field utilization sensor and said optical sensor in the state that said sheet is not placed, and correcting means for correcting at least the distance measured value measured by said magnetic field utilization sensor of distance measured values measured by said magnetic field utilization sensor and said optical sensor in the state that said sheet is placed on said metallic backup surface with said correcting measured value stored in said storage means.

3. A sheet thickness measuring apparatus as claimed in claim 2 wherein said magnetic field utilization sensor comprises a static magnetic field type sensor.

4. A sheet thickness measuring apparatus as claimed in claim 2 wherein said magnetic field utilization sensor comprises an eddy current type sensor.

5. A sheet thickness measuring apparatus as claimed in claim 2 wherein said magnetic field utilization sensor comprises a high frequency oscillation type sensor.

* * * * *